United States Patent [19]

Mundus

[11] 4,371,413
[45] Feb. 1, 1983

[54] APPARATUS FOR APPLYING TRANSVERSE WELD OR WELD-SEVERING SEAMS TO A WEB OF THERMOPLASTIC OR HOT-SEALABLE MATERIAL

[75] Inventor: Friedhelm Mundus, Lengerich of Westphalia, Fed. Rep. of Germany

[73] Assignee: Windmoller & Holscher, Lengerich of Westphalia, Fed. Rep. of Germany

[21] Appl. No.: 281,166

[22] Filed: Jul. 7, 1981

[30] Foreign Application Priority Data

Jul. 9, 1980 [DE] Fed. Rep. of Germany ....... 3026038

[51] Int. Cl.³ .............................................. B32B 31/20
[52] U.S. Cl. .................................. 156/349; 156/251; 156/515; 156/538
[58] Field of Search ...................... 156/380.7, 515, 251, 156/349, 538

[56] References Cited

U.S. PATENT DOCUMENTS 3,758,366  9/1973  Ballestrazzi et al. .............. 156/515
3,884,129  5/1975  Monahan ........................... 156/515
3,992,981  11/1976  Stock ................................. 156/515

*Primary Examiner*—Caleb Weston
*Attorney, Agent, or Firm*—Fleit & Jacobson

[57] ABSTRACT

In welding apparatus for web material, one of a pair of feed rollers for the web is reciprocatable by a crank shaft. A swing arm oscillated by the crank shaft oscillates a gear segment for intermittently driving the feed rollers. A clutch and brake unit for uncoupling and braking the feed rollers and vice versa is operated by a cam rotating with the crank shaft. The crank shaft is operatively connected to a disc which is provided with an eccentric slide block and turns at the same speed as the crank shaft. The slide block is longitudinally displaceable in a slot of the swing arm. The driving motion for the feed rollers occurs during rotation of the slide block by way of the sector remote from the pivot shaft of the swing arm.

2 Claims, 3 Drawing Figures

APPARATUS FOR APPLYING TRANSVERSE WELD OR WELD-SEVERING SEAMS TO A WEB OF THERMOPLASTIC OR HOT-SEALABLE MATERIAL

The invention relates to an apparatus for applying transverse weld or weld-severing seams to a web of thermoplastic or hot-sealable material, comprising a pair of welding jaws of which one is reciprocatable by a crank drive by way of a connecting rod, a swing arm which is oscillated by a drive derived from the crank shaft and oscillates a gear segment by way of a coupling rod, a pinion which is in mesh with the gear segment and intermittently drives a pair of feed rollers for the web, and a clutch-brake unit for the feed rollers which, after the feeding motion of the gear segment, uncouples the feed rollers from their drive and brakes them and, on commencement of the feeding motion, recouples them to the drive after release of the brake, and of which the operating times are determined by an operating cam which rotates with the crank shaft and actuates appropriate contacts.

In an apparatus of this kind known from DE-GMS No. 68 12 559, the swing arm is driven directly by the crank shaft in that one end of a coupling bar is mounted on a crank pin rotating with the crank shaft, the other end being pivoted to the swing arm. This construction has the disadvantage that the duration of pivoting of the gear segment is the same for forward and return motion. Consequently, the time available for feeding the web of film is exactly the same as the standstill period of the web during which welding or cutting takes place. Since film is nowadays available for which the required welding times are considerably shorter than for the film used years ago, it is desirable to set the welding machines so that the time available for feeding during a machine cycle is longer than the standstill period. The more time is available for the feeding motion, the more gently and carefully can the machine be operated because the accelerating forces occurring during each feeding motion can be kept small. If the time available for feeding the web during each machine cycle can be prolonged in relation to the welding time, it is also possible to increase the output of the machine by increasing the number of cycles.

It is therefore the problem of the present invention to provide an apparatus of the aforementioned kind in which during each machine cycle the driving periods for the feed rollers are prolonged relatively to their standstill periods.

According to the invention, this problem is solved in that the crank shaft is operatively connected to a disc which is provided with an eccentric slide block and turns at the same speed as the crank shaft, that the slide block is longitudinally displaceable in a slotted guide of the swing arm, and that the driving stroke for the feed rollers occurs during rotation of the slide block by way of the sector remote from the pivot shaft of the swing arm. Since in the apparatus of the invention the slide block for pivoting the swing arm turns at a uniform speed derived from the machine drive and the circular path executed by the slide block is sub-divided into a larger and a smaller sector by the tangent drawn from the pivot shaft of the swing arm to the circular path, the path of the slide block along the larger sector is utilised for driving the feed rollers, so that the driving period for the rollers is related to the standstill period in the same way as the central angle of the larger sector is related to the smaller one.

It is particularly advantageous that in the apparatus of the invention the angle of rotation of the feed rollers during each driving phase can be simply changed in that the spacing of the pivot of the coupling rod for oscillating the gear from the pivot shaft of the swing arm is increased or reduced, which can be simply effected by a spindle drive. The machine can therefore be set to different sizes only by adjusting this pivot point.

The machine of the invention can be equipped with cutting or stamping tools or the like instead of welding tools.

One example of the invention will now be described in more detail with reference to the drawing, wherein.

Figure 1:
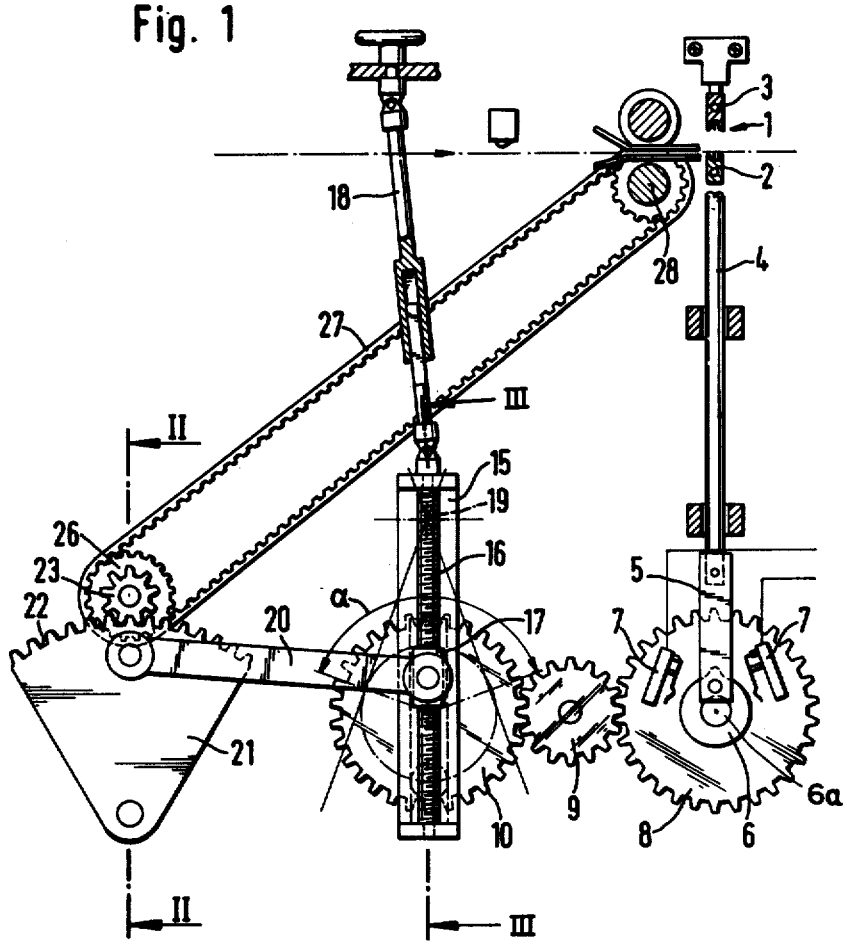
FIG. 1 is a diagrammatic side elevation of the welding apparatus.

The welding equipment 1 consists of a fixed weld jaw 2 and a movable weld jaw 3 which is reciprocatable by the tappet rod 4 and connecting rod 5 in a manner not illustrated in more detail. The connecting rod 5 is mounted on a crank pin of the cam plate 6 which can actuate two contacts 7 by way of a cam. The cam plate 6 is rotated by a crank shaft 6a.

The two contacts 7 are at a very particular angle α to each other. A gear 8 is connected concentrically to the cam plate 6 and is in mesh with a drive gear 9. This drive gear 9 is in mesh with a further gear 10 which is rotatable on a pin 11 which is in turn connected to a housing wall 12. This gear comprises a crank pin 13 which is reciprocatable in the slot 14 of the swing arm 15. An adjusting spindle 16 mounted on the swing arm 15 has a slide block 17 placed on it of which the position can be varied by actuating the setting linkage 18. The swing arm itself is again pivotably mounted in the housing wall 12 by way of a pin 19.

Figure 2:
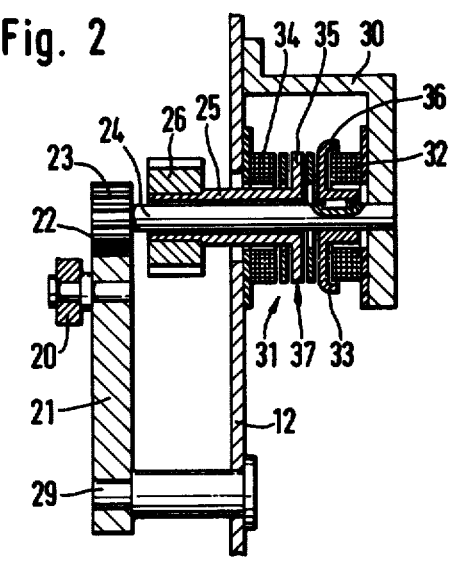
FIG. 2 is a section through the apparatus taken on the line II—II in FIG. 1.
Figure 3:
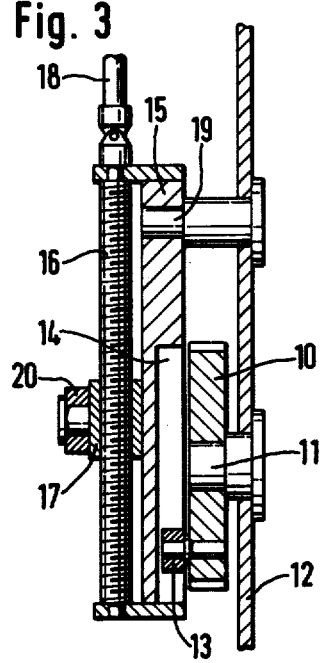
FIG. 3 is a section through the apparatus taken on the line III—III in FIG. 1.

As is particularly clear from FIG. 1, a connecting rod 20 connected to the slide block 17 is connected at the end remote from the slide block to a gear segment 21 which moves to and fro during operation of the machine. A gear 23 mounted on a shaft 24 engages the teeth 22 of this segment 21. A further hollow shaft 25 carrying a pulley 26 at one end is mounted on this shaft 24. This pulley is connected to the feed roller 28 by way of a toothed belt 27. As is shown in FIG. 2, the segment 21 is likewise connected to the housing wall 12 by a pin 29. Also connected to the side wall 12 there is a bracket 30 in which one end of the shaft 24 is mounted. A generally known clutch-brake unit 31 is placed over the shaft 24 and the hollow shaft 25 in the region between the mounting of the shaft 30 in the bracket 30 and the housing wall 12. This unit comprises a magnetic coil 32 connected to the bracket 30, a rotor 33 connected to the shaft 24, a further coil 34 connected to the housing wall 12, the armature plates 35 and 36 and the collar of the hollow shaft 25. Depending on operation of the coils 32 and 34, the armature plates 35, or depending on operation also 36, are attracted and thus the collar 37 is brought into operative connection either with the coil 34 or with the rotor 33 in that the armature plates are movably connected to the collar. This means that the collar 37 and thus also the hollow shaft are braked when the coil 34 is electrically energised. When the coil 32 is energised, the collar 37 is pulled towards the rotor 33, whereby the hollow shaft is connected to the shaft 24 so that the pulley 26 is then fixed to the gear 23 and the driving connection to the feed roller has been established.

Operation or energisation of the coils 32 and 34 takes place alternately, namely depending on the angular position of the contacts 7 to each other, once this has been chosen. The angle α is a measure of the switching-on period of the coil 34 and thus the brake, i.e. welding can take place during this relatively short time. This welding period is also the time available to the crank system for return movement. If the slide block 17 is now adjusted by the linkage 18, the angle of rotation of the feed roller is changed but the ratio of feeding to the welding period always remains constant. It is therefore now possible to change to different sizes merely by actuating the setting linkage.

I claim:
1. Device for application of transverse weld or weld-severing seams to a web of material comprising:
 a pair of welding jaws, one of which is reciprocatable;
 crank drive means for reciprocating said one jaw and having a rotatable shaft, rod means moved by said crank shaft for moving said one jaw, and a cam plate secured to said crank shaft;
 contact means actuatable by said cam plate during rotation of said crank shaft for producing control signals;
 a gear (10) carrying a crank pin;
 first drive means for interconnecting said crank shaft and said gear (10) so that said gear (10) is rotatably driven by said crank shaft and rotates at the same speed as said crank shaft;
 a swing arm having a longitudinally-extending slot formed therein receiving said crank pin so that said crank pin is longitudinally displaceable therein and said swing arm is oscillated by rotation of said gear (10);
 a shaft supporting said swing arm for pivotal movement;
 a coupling rod having one end connected to said swing arm so that said coupling rod is movable by said swing arm;
 a gear wheel segment connected to a second end of said coupling rod so that the gear wheel segment is oscillated by said swing arm;
 feed roller means having a driving movement for feeding the web with respect to the welding jaws;
 second drive means for interconnecting said gear wheel segment and said feed roller means so that said gear wheel segment rotates said feed roller means thereby providing said driving movement;
 clutch-brake unit means responsive to said control signals for controlling driving movement of said feed roller means, said clutch-brake unit means being movable between a coupling position in which said feed roller means are driven by said gear wheel segment and an uncoupling position in which the feed roller means are uncoupled from said gear wheel segment,
 said gear (10) being positioned with respect to said shaft of said swing arm such that driving movement of said feed rollers occurs during rotation of said gear (10) through a sector facing away from said shaft.

2. Device according to claim 1, wherein said first drive means comprises a gear rotated by said crank shaft and a drive gear in meshing engagement with said rotated gear and said gear (10).

* * * * *